United States Patent
Schmid

Patent Number: 5,911,197
Date of Patent: Jun. 15, 1999

[54] CANINE TRAINING DEVICE

[75] Inventor: Rainer Schmid, Dexter, Oreg.

[73] Assignee: Orthopedic Design, Eugene, Oreg.

[21] Appl. No.: 09/005,284

[22] Filed: Jan. 9, 1998

[51] Int. Cl.$^6$ .................................................. A01K 15/02
[52] U.S. Cl. .......................... 119/712; 119/905; 119/709; 2/2.5; 2/16
[58] Field of Search ..................................... 119/709, 712, 119/850, 905; 602/62, 63, 42, 44; 2/2.5, 16, 59, 158, 459, 460, 45

[56] References Cited

U.S. PATENT DOCUMENTS

| | | | |
|---|---|---|---|
| 1,510,783 | 10/1924 | Johnson | 2/16 |
| 2,082,574 | 6/1937 | Hanley | 2/16 |
| 3,902,196 | 9/1975 | Reinfandt | 2/2.5 |
| 3,924,272 | 12/1975 | Allen et al. | 2/16 |
| 4,011,596 | 3/1977 | Chang | 2/16 |
| 4,784,128 | 11/1988 | Scheuermann | 602/61 |
| 4,942,624 | 7/1990 | Cho | 2/16 |
| 5,062,589 | 11/1991 | Roth et al. | 244/117 R |
| 5,188,587 | 2/1993 | McGuire | 602/20 |
| 5,221,222 | 6/1993 | Towens | 446/26 |
| 5,357,633 | 10/1994 | Rael | 2/16 |
| 5,491,840 | 2/1996 | Yen | 2/16 X |
| 5,681,268 | 10/1997 | Radman | 602/20 |
| 5,827,207 | 10/1998 | MacMorran | 602/5 |

FOREIGN PATENT DOCUMENTS

| | | | |
|---|---|---|---|
| 2826359 | 1/1980 | Germany | 119/850 |

Primary Examiner—Michael J. Carone
Assistant Examiner—James S. Bergin
Attorney, Agent, or Firm—Burns, Doane, Swecker & Mathis, L.L.P.

[57] ABSTRACT

A canine training device protects a helper's hand and arm while training a dog to bite and hold the arm of a human. The canine training device includes a sleeve which fits over the helper's arm and is shaped to correspond to the shape of the helper's forearm and hand. A bite bar is secured to an exterior surface of the sleeve and has a substantially wedge-shaped cross-section. A cover is arranged over the sleeve and the bite bar for grasping by the dog. The training device also includes a separate upper arm guard which is secured to the arm of the helper and covers the upper arm from the shoulder to the elbow. The bite bar is preferably adjustable on the sleeve to achieve different presentation angles for different wearers. The training device provides improved comfort and improved responsiveness due to the contoured shape of the training device sleeve.

21 Claims, 5 Drawing Sheets

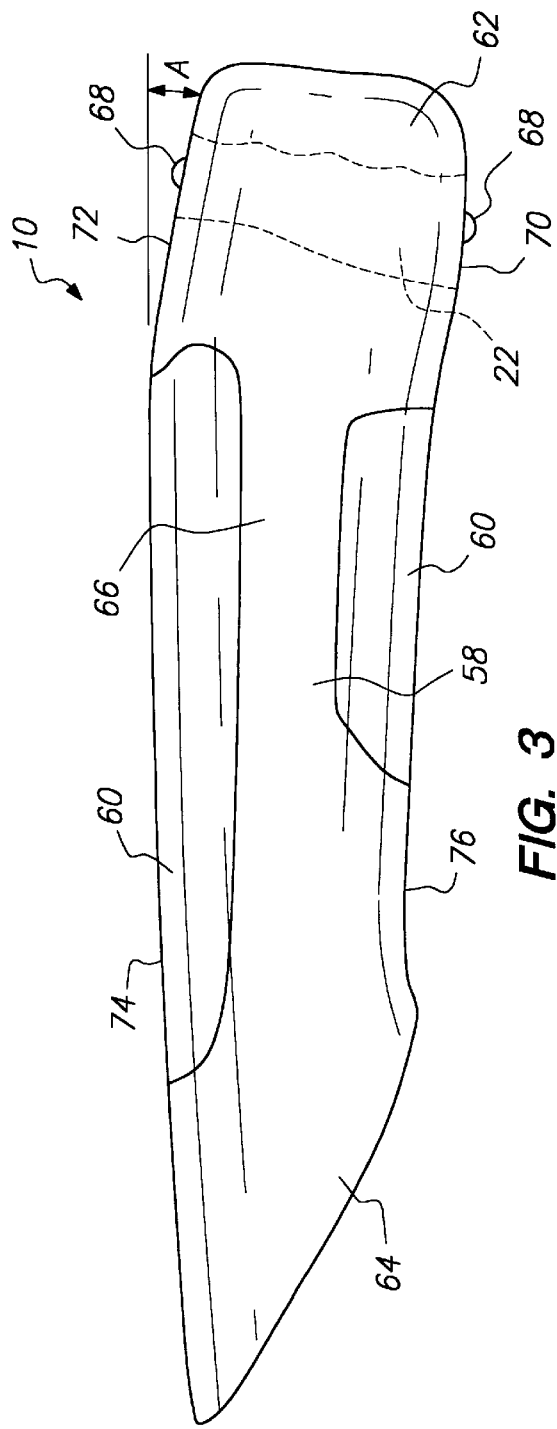
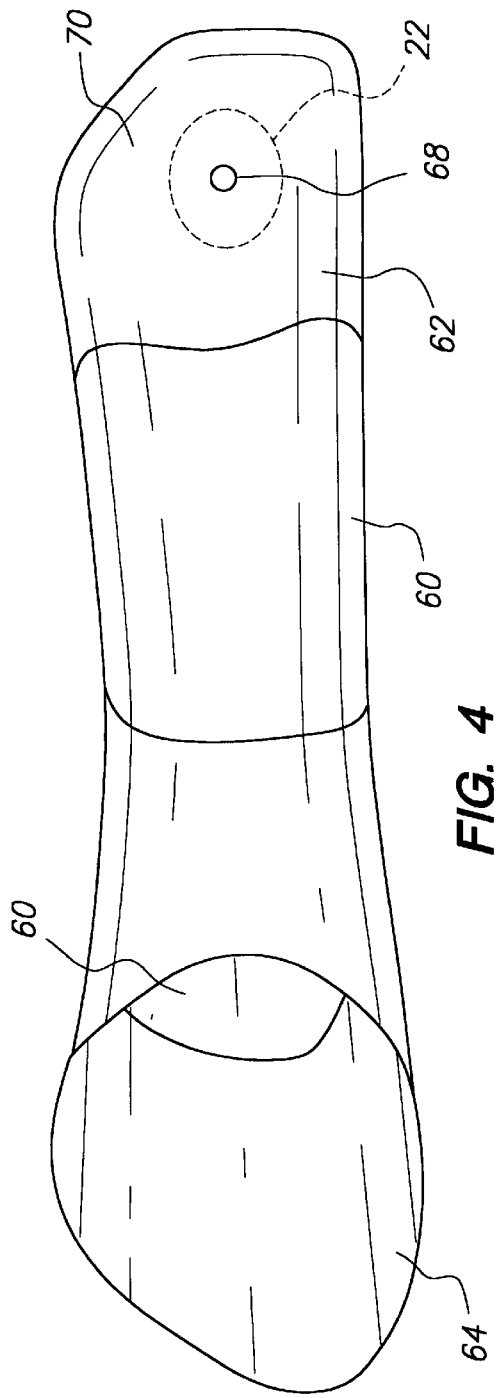
FIG. 3
FIG. 4

CANINE TRAINING DEVICE

BACKGROUND OF THE INVENTION

1. Field of the Invention

The invention relates to a canine training device, and more particularly, the invention relates to a training device including a sleeve for protecting a person's arm during canine training.

2. Brief Description of the Related Art

Instruction and training of police dogs, security dogs, and sport dogs requires specialized equipment to protect both the people training the dog and the dog during training exercises. Training of police, security and sport dogs includes training the dogs to grab and hold the arm or wrist of a threatening person. Once the dog has successfully immobilized the arm, a person will be less of a threat because the arm which may be holding a gun, knife, or other weapon can no longer be used.

Training of a dog for security use or competition requires that the dog be trained to bite and hold the arm or wrist of an attacker. During training, the trainer will handle and instruct the dog to bite the arm of a helper who is outfitted with a special protective training device. The training device surrounds the helper's arm and allows the dog to safely bite the training device without injuring the helper or causing injury to the dog's teeth. The helper must angle the training device so that as the dog leaps toward the helper, the dog will grasp the sleeve and be swung around by the helper. The training devices used for this training procedure generally consist of a padded sleeve of some sort which surrounds the arm and hand of the helper and has a soft fabric cover to be grasped by the dog.

One type of training sleeve which is used for dog training includes a cylindrical tube having a dowel secured within the tube at a first end of the tube. The tube fits over the helper's forearm and the dowel is grasped in the helper's hand. A bite bar which is a wedge shaped member is secured to the tube by glue and/or stitching. The bite bar and tube are generally covered with leather. The tube and bite bar are surrounded by a padded cover which the dog bites into and holds. An upper arm guard in the form of a second tube is provided for protection of the upper arm and is connected to the tube surrounding the forearm at the elbow by a leather hinge. One example of such a training device is illustrated in German patent No. 2,826,359.

There are substantial drawbacks to this know training device design, particularly in the areas of comfort for the helper and safety for the dog. In particular, due to the shape of the cylindrical tube and the manner of holding the tube by grasping the dowel in a fist, a majority of the force during working of the dog is transmitted from an inside surface of the tube to the knuckle of the index finger and the knuckle of the thumb. In fact, when the dog makes full contact with the sleeve for a bite the entire weight of the dog may be supported primarily on these two knuckles causing extreme fatigue of the helper.

In addition, due to the cylindrical shape of the tube there is a large amount of space between portions of the helper's arm and hand and the inside surface of the tube. Accordingly, there is a delay between an arm movement of the helper and a corresponding movement of the sleeve. This delay may prevent the helper from getting the sleeve into a proper presentation position and cause the dog to miss the sleeve. Further, the fixed angle at which the bite bar is positioned on the tube will not always achieve an optimal working position. With the known training devices, the teeth of the dog may also become lodged in the training device and break off.

The known training devices are formed of heavy materials including foam, leather, and canvas, the weight of which leads to helper fatigue. Finally, the hinge between the lower arm tube and the upper arm tube of the known training devices prevents relative rotation of the forearm with respect to the upper arm, called pronation and supination.

Accordingly, it would be desirable to provide a training device with improved helper comfort, improved responsiveness, adjustability for different working positions, and improved safety for the dog being trained.

SUMMARY OF THE INVENTION

The present invention relates to a canine training device which fits over a helpers arm and hand to protect the helper while the dog is trained to bite and hold onto the arm. The training device includes a contoured sleeve configured to the shape of the arm and fist and a bite bar attached to the sleeve.

In accordance with one aspect of the present invention, a canine training device includes a sleeve having an inner surface shaped to correspond to a shape of a helper's forearm and hand and an anatomical grip secured within the sleeve for grasping by the helper's hand. A bite bar is secured to an exterior surface of the sleeve and has a substantially wedge shaped cross section. A cover is arranged over the sleeve and the bite bar.

In accordance with an additional aspect of the present invention, a canine training device includes a training device sleeve for covering a user's forearm and hand during training, a bite bar, and a means for securing the bite bar to the training device sleeve. The bite bar has an interior surface configured to be received over at least a portion of the training device sleeve. The means for securing the bite bar to the training device sleeve allows adjustment of a position of the bite bar with respect to the sleeve.

The present invention provides advantages of improved helper comfort and improved responsiveness due to the contoured shape of the training device sleeve. In addition, the invention allows the position of the bite bar to be adjusted for different working positions of the helper. Further, the bite bar provides improved safety for the dog by preventing the dog's teeth from being caught in the training device and breaking.

BRIEF DESCRIPTION OF THE DRAWINGS

The invention will now be described in greater detail with reference to the preferred embodiments illustrated in the accompanying drawings, in which like elements bear like reference numerals, and wherein:

FIG. 3 is a top view of the sleeve according to the present invention;

FIG. 4 is a side view of the sleeve of FIG. 3;

DETAILED DESCRIPTION OF THE PREFERRED EMBODIMENTS

Figure 1:
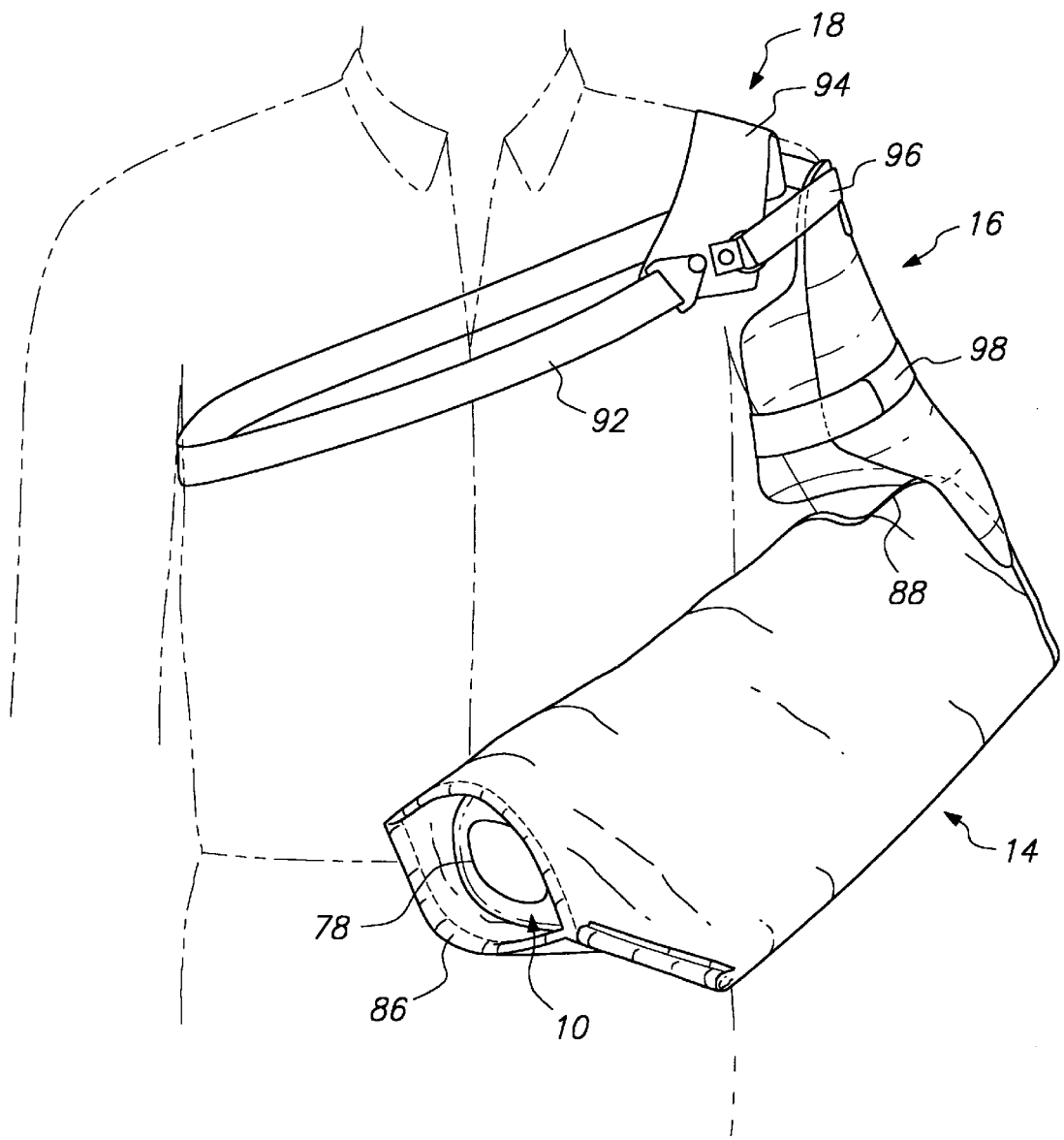
FIG. 1 is a perspective view of a helper wearing the training device according to the present invention.
Figure 2:
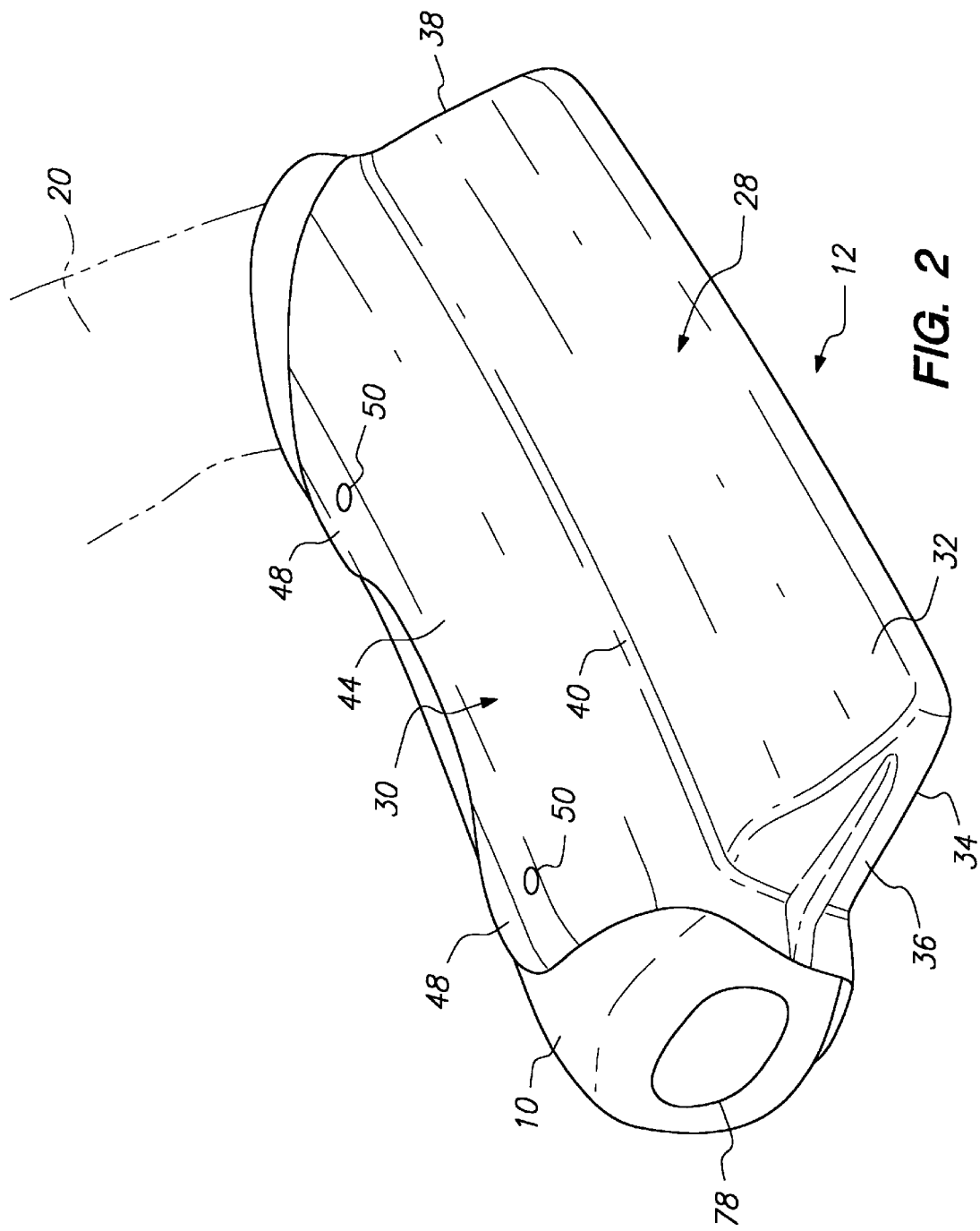
FIG. 2 is a perspective view of the sleeve and bite bar according to the present invention without the cover.

A canine training device according to the present invention protects a helper's hand and arm while training a dog to grasp and hold the arm of a human. As shown in FIGS. 1 and 2, the canine training device according to the present invention includes a sleeve 10, a bite bar 12 attached to the sleeve, a cover 14 surrounding the sleeve and bite bar, an upper arm guard 16, and a harness 18. The sleeve 10 surrounds the forearm and hand of the helper and is contoured to the shape of the forearm and hand when the hand is in a fist. The bite bar 12 is secured to the sleeve 10 and provides a wedge shaped portion which is easily grasped by the dog. The cover 14 is formed of a flexible padding material which covers the sleeve 10 and the bite bar 12. The upper arm of the helper is protected by the upper arm guard 16 which is held in place by the harness 18. Each of these parts will be described in further detail below with respect to FIGS. 1–7.

FIG. 2 is a perspective view of the sleeve 10 and attached bite bar 12 according to the present invention in a position in which the training device is held during use on the left arm 20 of a helper. The arm 20 is placed inside the sleeve 10 with the hand grasped in a fist around an anatomically shaped grip 22 (shown in FIG. 5) which is positioned within the sleeve. During use the helper's fist is positioned with a top of the hand oriented generally upward and slightly outward away from the body. The sleeve 10 is preferably a composite member which is contoured to conform to the shape of the forearm and fist as will be described in detail with reference to FIGS. 3 and 4.

The bite bar 12 is a molded one piece member including a wedge shaped bite portion 28 which is grasped by the dog and a C-shaped portion 30 for connecting the bite bar to the sleeve 10. The bite portion 28 of the bite bar 12 extends substantially along the entire length of the sleeve 10 so that the dog can bite on any location along the forearm and hand of the wearer. The bite portion 28 is anatomically configured to the shape of the dog's teeth and includes an upper surface 32, a lower surface 34, a first end 36 and a second end 38. As shown in the end view of FIG. 6, the upper and lower surfaces 32, 34 are each slightly concave. Accordingly, the bite bar 12 can accommodate dogs having different size jaws. For example, a small dog may grasp the edge of the bite bar having a dimension D1 while larger dog, such as the dog illustrated in FIG. 6, can grasp a larger portion of the bite bar having a dimension D2. The bite portion 28 of the bite bar 12 extends from the sleeve 10 a distance which is larger than a width of the sleeve preventing the dog from biting into the sleeve.

The bite bar 12 also has a groove 40 around a circumference of the bite bar between the bite portion 28 and the C-shaped portion 30. This groove accommodates the canine teeth of a large dog. The groove 40 also imparts additional stiffness to the bite bar 12. The C-shaped portion 30 is contoured to correspond in shape to an exterior of the sleeve 10. An upper arm 44 and a lower arm 46 of the C-shaped portion each include two protruding tongues 48. The bite bar 12 is secured to the sleeve 10 by four fasteners 50 which are generally positioned at each of the tongues 48, two at the top and two on the bottom of the bite bar. The fasteners 50 extend through openings in the bite bar 12 and through corresponding openings in the sleeve 10. The fasteners 50 may be stud screws, removable rivets, or other fasteners which allow the bite bar 12 to be removed and repositioned on the sleeve 10. The repositioning is performed by removing the fasteners 50, rotating the bite bar 12 with respect to the sleeve 10 and refastening the fasteners in another set of openings in the sleeve.

Figure 7:
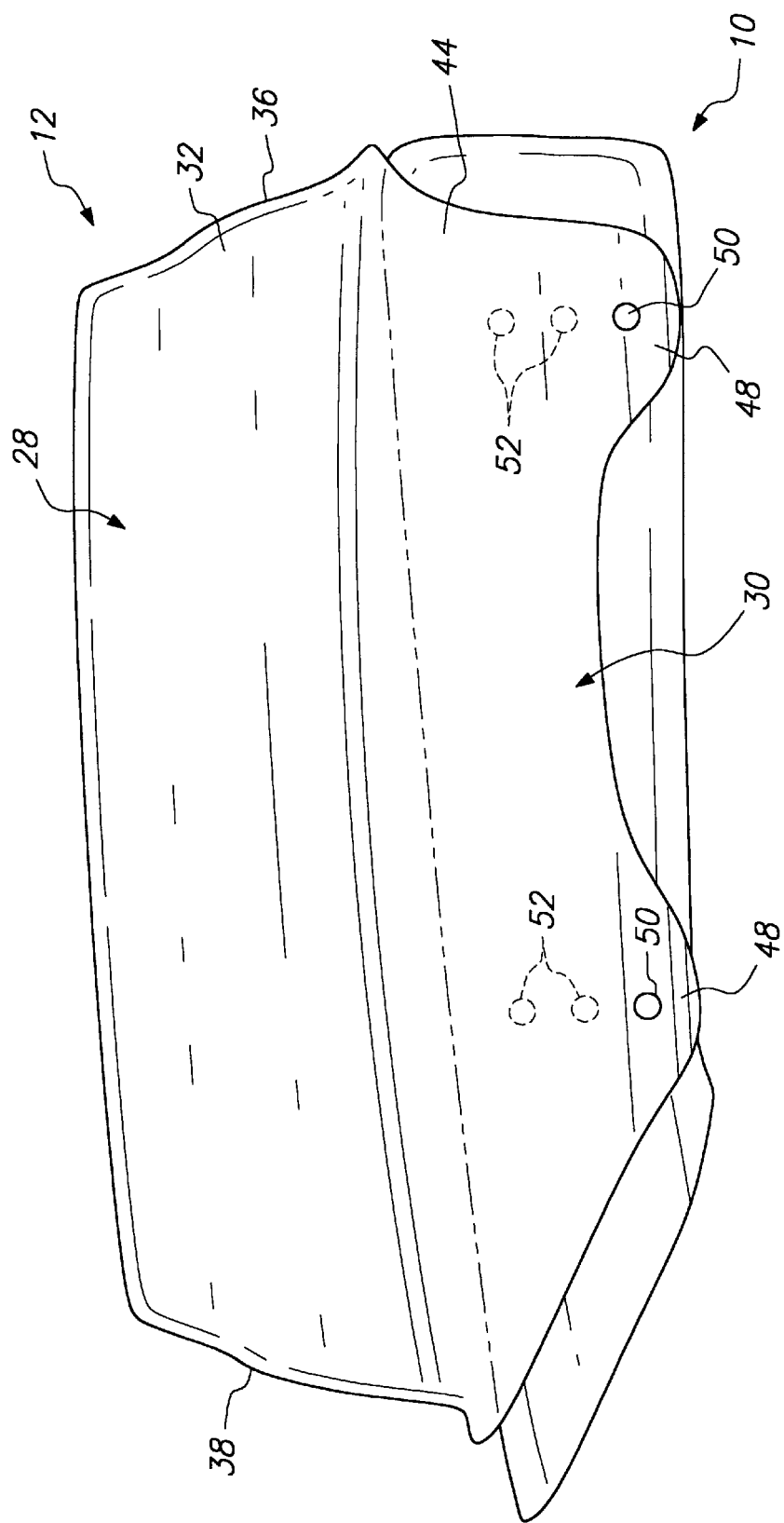
FIG. 7 is a top view of the sleeve and the bite bar.

As illustrated in FIG. 7. the openings 52 in the sleeve 10 for adjustment of the bite bar 12 position are arranged generally in a line along the sleeve. Although the invention has been described as having a single hole in the bite bar 12 for each fastener 50 and a plurality of openings 52 in the sleeve, a similar result can be achieved by providing a series of holes in the bite bar and a single opening for each fastener in the sleeve. Further, any number of fasteners can be used which will securely hold the bite bar position on the sleeve 10. According to an alternative embodiment, the fasteners and corresponding holes may be replaced by any other type of known adjustable fastener such as VELCRO, snaps, or the like.

Figure 6:
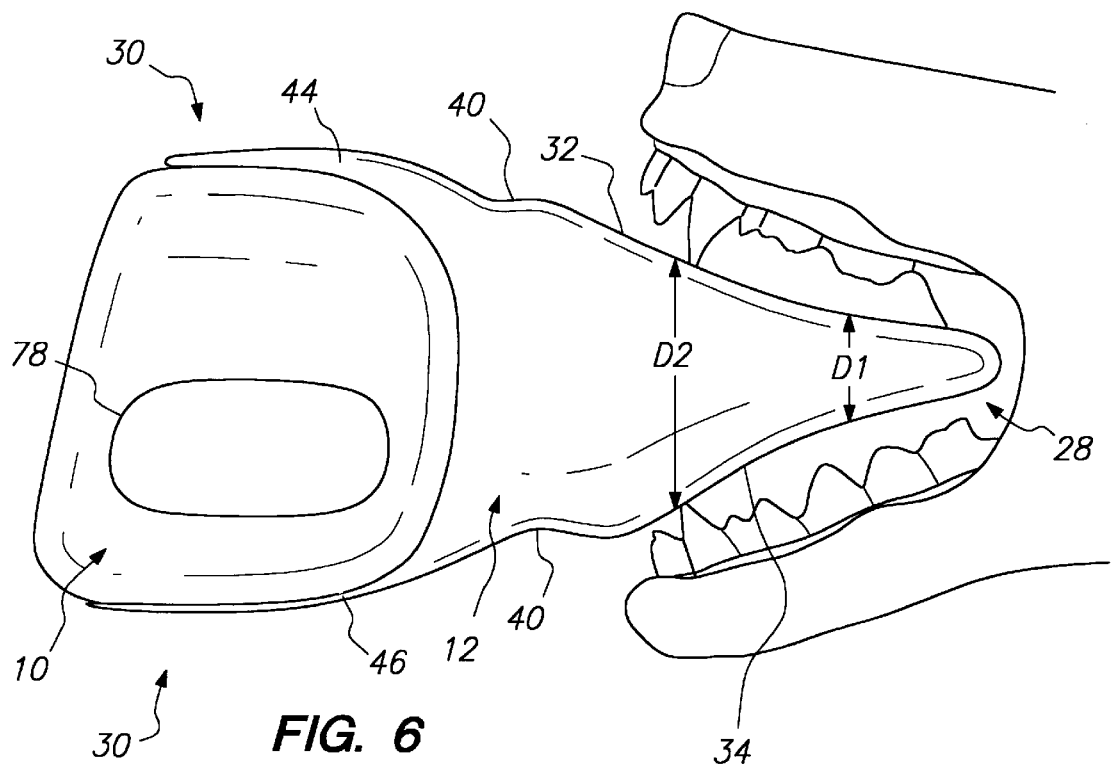
FIG. 6 is an end view of the sleeve and bite bar of the present invention showing the teeth of a dog biting the bite bar.

The bite bar 12 is preferably formed of a lightweight plastic. The bite bar material is preferably a medium to soft material such as polyethylene, polypropylene, copolymer, composites, and the like. As shown in FIG. 6, the bite bar 12 is positioned on the sleeve 10 with the bite portion 28 extending away from the sleeve so that the dog is prevented from biting into the sleeve and prevents the canine teeth from breaking off due to contact with the harder material of the sleeve.

With reference to FIGS. 3 and 4, the sleeve 10 includes a frame 58 formed of a high strength material and a light weight filler material 60 filling openings in the frame to provide a light weight and strong sleeve. FIG. 3 shows a top view of the sleeve 10 in a position in which the sleeve is held when the grip 22 is grasped in the hand and the back of the hand faces upwards. The sleeve frame 58 includes a distal ring 62, a proximal ring 64, and two beams 66 connecting the distal and proximal rings on the top and bottom of the sleeve.

The grip 22 is positioned within the distal ring 62 of the frame and is secured to the distal ring by fasteners 68. The grip 22 may be rotatable or fixed within the sleeve 10 depending on the helper's preference. The distal ring 62 is positioned at an angle with respect to the remainder of the sleeve to accommodate the bend of the helper's wrist between the top of the wrist and the top of the thumb. The angle between the distal ring 62 and the rest of the sleeve to accommodate wrist adduction is illustrated by the angle A of a side surface 72 of the distal ring with respect to a side surface 74 of the sleeve. According to one embodiment of the invention, the angle A is about 5 to 25 degrees, preferably about 14 degrees.

The distal end ring 62 is configured with two substantially planar side surfaces 70, 72 where the grip 22 is attached to the sleeve 10. These substantially planar surfaces 70, 72 abut the metacarpal between the index finger and the thumb, and the little finger and the metacarpal of the little finger, respectively. These surfaces 70, 72 correspond in shape to the fist and evenly distribute the forces occurring when the dog grabs the training device. This provides a significant advantage over the use of a cylindrical tube shaped training device in which pressure is concentrated on one or two knuckles of the hand.

The proximal ring 64 of the sleeve 10 has an angled proximal end such that a length of the sleeve 10 along a first side surface 74 is substantially longer than a length of the sleeve along a second side surface 76. This difference in length of the two sides 74, 76 of the sleeve 10 allows the sleeve to cover and protect the elbow of the helper without interfering with the ability to bend the arm. The proximal ring 64 of the sleeve is oval in cross section to accommodate the forearm muscles. As shown in FIG. 4, the sleeve 10 has a smaller cross-section at a central portion and enlarged ends to accommodate the fist and the forearm muscles. The sleeve 10 also has a distal end opening 78, shown in FIG. 2, for airflow and cooling of the helper's arm and hand.

A majority of the strength of the sleeve 10 is provided by the sleeve frame 58 including the rings 62, 64, and the beams 66. The frame 58 is preferably formed of a high strength, lightweight material such as carbon composite, or other composites which provide beams 66 which do not bend. The materials may vary in strength needed depending on the age and breed of dog to be trained. The filler material 60 is used primarily to fill the voids in the frame 58 and, provides a comfortable smooth interior surface of the sleeve. The filler material 60 is preferably a single layer and provides little additional structural strength to the sleeve 10. The filler material is preferably a lightweight material, such as Kevlar or any other lightweight material which bonds to the material of the frame 58. The light weight and strength of the sleeve 10 improves the training by increasing the precision and agility with which the helper can move the sleeve preventing injury to the dog and the helper by allowing the helper to move quickly to a working position.

Figure 5:
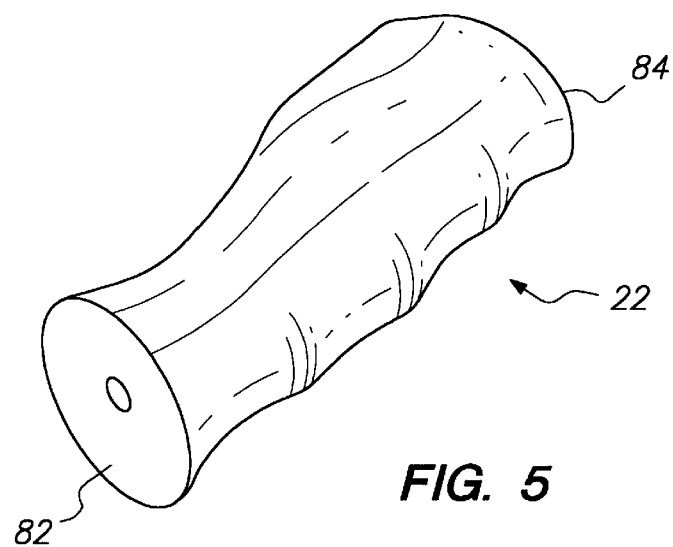
FIG. 5 is a perspective view of the hand grip of the sleeve.

FIG. 5 illustrates an enlarged perspective view of the hand grip 22 which is mounted inside the distal ring 62 of the sleeve 10. The grip 22 is contoured to the shape of the hand and has opposite ends 82, 84 which are substantially planar for engagement with the side surfaces 70, 72 of the sleeve 10. Preferably, the grip 22 is formed of a compliant material, such as cork which prevents slipping, is lightweight, and is sufficiently compliant to provide comfort, yet is sufficiently rigid to allow the sleeve to respond quickly to movements of the hand and arm.

The cover 14 is in the form of a sleeve with a distal end opening 86 and a proximal end opening 88. The cover 14 is preferably formed of a heavy weight fabric such as jute or canvas which may be quilted. The cover may also be formed of foams, elastomers, silicones, or the like which will hold up under bitework and are light in weight. The cover 14 slides over the sleeve 10 and bite bar 12 after the bite bar has been attached to the sleeve. The cover 14 is secured to the sleeve at a proximal end of the sleeve by any suitable method such as VELCRO or tying. According to one embodiment of the invention, the cover 14 is secured on the sleeve 10 by a leather strap which passes alternately through loops inside the cover and loops on the distal end of the sleeve.

For protection of the upper arm of the helper, the upper arm guard 16 is suspended from the shoulder by a harness 18 and covers the upper arm 20 of the helper from the shoulder to the elbow. Preferably, the upper arm guard 16 extends approximately three inches below the sleeve 10 on the outside of the arm to completely cover the helper's elbow. The harness 18 includes an upper body strap 92, a shoulder web 94, and a shoulder strap 96. The shoulder web 94 extends over the shoulder of the helper to support the upper arm guard 16. The upper body strap 92 extends from the shoulder web 94 around the helper's torso and under the opposite arm of the helper. The shoulder strap 96 extends from the shoulder web 94 around an outside of the shoulder and is secured to an upper end of the arm guard 16.

A bicep strap 98 secures the upper arm guard 16 to the arm. The bicep strap 98 may be attached to the upper arm guard 16 or may be a separate strap which is secured around the arm guard and arm. The straps 92, 96, 98 which hold the upper arm guard 16 in place on the upper arm of the helper are preferably adjustable by an adjustment mechanism such as a buckle or VELCRO. The straps may also be formed of an elastic material or include elastic inserts for improved mobility and comfort.

The upper arm guard 16 is substantially bell-shaped and is curved to surround an exterior of the upper arm, as well as a portion of the proximal end of the sleeve 10. The upper arm guard 16 is formed of a plastic material or another strong and lightweight material. The upper arm guard 16 according to the present invention is separate from the sleeve 10 and allows relative rotation between the forearm and the upper arm of the helper. The separate upper arm guard allows pronation and supination of the forearm to achieve a proper working position for dogs of different breads and ages which tend to approach a helper at different angles.

The training device according to the present invention includes the sleeve 10 which is shaped to correspond to the shape of the hand and forearm and thus, the arm movement of the helper is directly transferred to the sleeve so that efficiency in presenting the training device to the dog is improved. This quicker presentation of the training device to the dog will also provide a safer presentation for the dog because a delay in presentation of the training device can cause injury to the dog if the dog bites into an improper part of the training device or misses the training device altogether. The shape of the sleeve 10 also provides more power and control for the helper during presentation of the sleeve to the dog.

The light weight of the training device according to the present invention is due to the use of lightweight materials such as carbon composites, Kevlar, and plastics. The reduction in weight also increases the speed with which the helper can present the training device to the dog by allowing more precise and agile movements.

The ability to adjust the working position of the bite bar 12 on the sleeve 10 enables individual helpers to find an optimal angle for presentation of the bite bar to the dog. The optimally angled bite bar provides for improved safety and comfort and less fatigue during use.

While the invention has been described in detail with reference to the preferred embodiments thereof, it will be apparent to one skilled in the art that various changes and modifications can be made and equivalents employed, without departing from the present invention.

What is claimed is:

1. A canine training device comprising:
   a sleeve having an anatomically shaped inner surface shaped to correspond to the exterior contour of a helper's forearm and hand;
   a grip secured within the sleeve for grasping by the helper's hand;
   a bite bar secured to an exterior surface of the sleeve and having a substantially wedge shaped cross section; and
   a cover arranged over the sleeve and the bite bar.

2. The canine training device according to claim 1, wherein the grip is secured within the sleeve between a first surface and a second surface of the sleeve, and wherein the first surface of the sleeve is a substantially planar surface arranged to engage the metacarpal region between the index finger and the thumb of the helper.

3. The canine training device according to claim 2, wherein the second surface is a substantially planar surface arranged to engage the metacarpal region of the little finger and the little finger of the helper.

4. The canine training device according to claim 2, wherein the first surface is substantially planar in two dimensions.

5. The canine training device according to claim 1, wherein the grip is contoured to accommodate the shape of the helper's hand.

6. The canine training device according to claim 1, wherein the sleeve has a frame formed of a distal ring, a proximal ring, and two beams connecting the distal ring and proximal ring.

7. The canine training device according to claim 6, wherein a filler material is provided between the distal ring, the proximal ring, and the two beams to form a complete sleeve.

8. The canine training device according to claim 7, wherein the frame is formed of a carbon composite and the filler material is a polyaramid fiber composite bonded to the carbon composite of the frame.

9. The canine training device according to claim 7, wherein the frame is formed of a first material and the filler material is a second material having lower strength than the first material.

10. The canine training device according to claim 6, wherein the frame includes two openings between the distal ring, the proximal ring, and the two beams and the openings are filled with a filler material.

11. The canine training device according to claim 1, wherein the grip is secured between a first side and a second side of the sleeve, the first side of the sleeve having a length which is shorter than the second side of the sleeve such that the longer second side of the sleeve covers at least a portion of the helper's elbow.

12. A canine training device comprising:
   a training device sleeve for covering a user's forearm and hand during canine training;
   a bite bar having an interior surface configured to be received over at least a portion of the training device sleeve; and
   means for securing the bite bar to the training device sleeve and allowing adjustment of a position of the bite bar with respect to the sleeve.

13. The canine training device according to claim 12, wherein the means for securing the bite bar to the training device sleeve includes at least one fastener and a plurality of holes formed in the bite bar and the training device sleeve for connecting the sleeve to the bite bar at a plurality of different relative orientations.

14. The canine training device according to claim 12, wherein the means for securing the bite bar to the training device sleeve allows the adjustment of an angle of the bite bar with respect to the training device sleeve in a plane substantially perpendicular to a longitudinal axis of the sleeve.

15. The canine training device according to claim 12, wherein the bite bar has a bite portion with a substantially wedge shape in cross section along substantially the entire length of the bite bar.

16. The canine training device according to claim 15, wherein the substantially wedge shaped cross section of the bite portion has first and second concave surfaces.

17. The canine training device according to claim 15, wherein the bite portion is connected to a C-shaped portion which extends around the sleeve and is removably secured to the sleeve by the means for securing.

18. The canine training device according to claim 12, further comprising an upper arm cuff separate from the training device sleeve and bite bar, the upper arm cuff including a contoured upper arm shield configured to cover the upper arm from the shoulder to the elbow and a shield support for securing the shield on the helper's arm.

19. A canine training device comprising:
   an anatomically shaped sleeve configured to be received over a forearm of a helper;
   a bite bar secured to an exterior surface of the sleeve and having a substantially wedge shape; and
   an upper arm cuff separate from the anatomically shaped sleeve including an upper arm shield configured to cover an upper arm of the helper from the shoulder to the elbow and a harness for securing the shield to the upper arm, wherein the forearm is able to pronate and supinate by rotation of the sleeve with respect to the cuff.

20. The canine training device according to claims 19, wherein the harness includes at least one strap which wraps around the upper arm.

21. A canine training device comprising:
   a sleeve configured to be received over a forearm of a helper;
   a bite bar extending from the sleeve and having a substantially wedge shape; and
   an upper arm cuff separate from the sleeve including an upper arm shield configured to cover an upper arm of the helper from the shoulder to the elbow and overlap the sleeve, and at least one strap for securing the shield to the upper arm, wherein the forearm is able to pronate and supinate by rotation of the sleeve with respect to the cuff.

* * * * *